(12) United States Patent
Chung et al.

(10) Patent No.: US 10,754,089 B1
(45) Date of Patent: Aug. 25, 2020

(54) DISPLAY MODULE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Cheng-Fa Chung, New Taipei (TW); Na Wang, Yantai (CN)

(73) Assignees: HONG FU JIN PRECISION INDUSTRY (Shenzhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/379,293

(22) Filed: Apr. 9, 2019

(30) Foreign Application Priority Data

Feb. 25, 2019 (CN) .......................... 2019 1 0137893

(51) Int. Cl.
*F21V 8/00* (2006.01)

(52) U.S. Cl.
CPC .......... *G02B 6/0088* (2013.01); *G02B 6/0093* (2013.01)

(58) Field of Classification Search
CPC ............................. G02B 6/0088; G02B 6/0093
See application file for complete search history.

(56) References Cited

U.S. PATENT DOCUMENTS

2019/0155088 A1* 5/2019 Lee ........................ G02F 1/1339

FOREIGN PATENT DOCUMENTS

| CN | 107340643 A | 11/2017 |
| TW | M569861 U | 11/2018 |

* cited by examiner

*Primary Examiner* — Thomas M Sember
(74) *Attorney, Agent, or Firm* — ScienBiziP, P.C.

(57) ABSTRACT

A display module includes a display panel, an optical film layer arranged on a side of the display panel, a light guide plate arranged on a side of the optical film layer away from the display panel, a backplane arranged on a side of the light guide plate away from the display panel, and a bonding member. The bonding member bonds together the display panel, the optical film layer, the light guide plate, and the backplane.

18 Claims, 5 Drawing Sheets

DISPLAY MODULE

FIELD

The subject matter herein generally relates to display modules, and more particularly to a display module having a full-screen display.

BACKGROUND

A display module generally includes a display panel, an optical component, and a backplane mounted together through a middle frame. The middle frame occupies space on a front side of the display module, which prevents full-screen optimization of the display panel.

BRIEF DESCRIPTION OF THE DRAWINGS

Implementations of the present disclosure will now be described, by way of embodiments, with reference to the attached figures.

DETAILED DESCRIPTION

Figure 1:
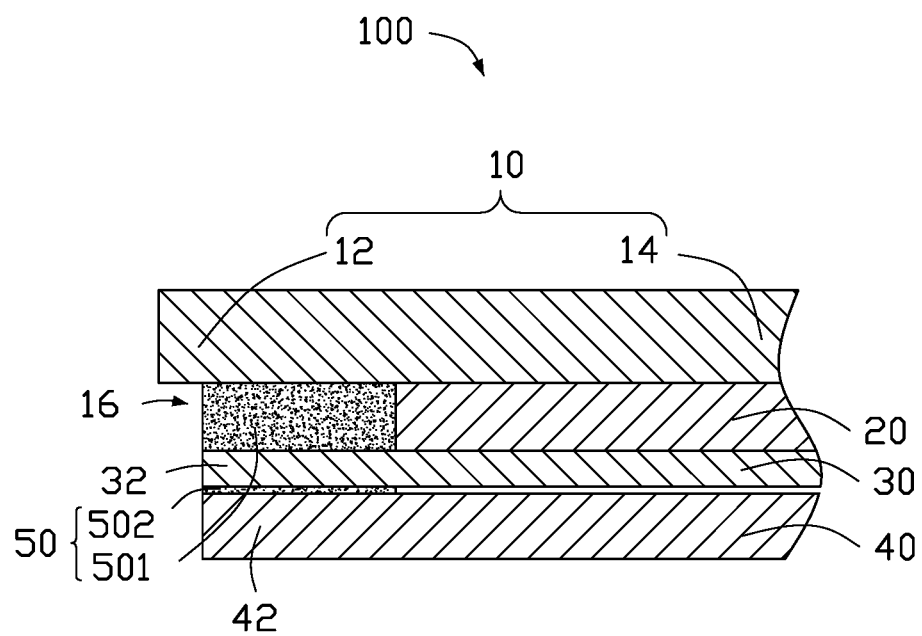
FIG. 1 is a cross-sectional view of a first embodiment of a display module.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described bonding member, group, series and the like.

FIG. 1 shows an embodiment of a display module 100. The display module 100 can be used in an electronic device 200. The electronic device 200 may be, but is not limited to, a television, a computer, an e-reader, a mobile phone, or the like.

The display module 100 includes a display panel 10, an optical film layer 20 arranged on one side of the display panel 10, a light guide plate 30 arranged on a side of the optical film layer 20 away from the display panel 10, a backplane 40 arranged on a side of the light guide plate 30 away from the display panel 10, and a bonding member 50. The bonding member 50 binds the display panel 10, the optical film layer 20, the light guide plate 30, and the backplane 40 together. The bonding member 50 includes a first bonding member 501 and a second bonding member 502. The first bonding member 501 binds the display panel 10, the optical film layer 20, and the light guide plate 30 together, and the second bonding member 502 binds the light guide plate 30 and the backplane 40 together.

The display panel 10 is substantially planar. The display panel 10 includes a display area 14 and a peripheral area 12 surrounding the display area 14. The first bonding member 501 binds the peripheral area 12 to the light guide plate 30.

The optical film layer 20 is substantially planar and is positioned facing the display area 14 of the display panel 10. An edge of the display panel 10 extends outwardly beyond an edge of the optical film layer 20. The light guide plate 30 is substantially planar. An edge of the light guide plate 30 extends outwardly beyond the edge of the optical film layer 20, but stops short of the edge of the display panel 10. The display panel 10, the optical film layer 20, and the light guide plate 30 cooperatively define a recessed region 16. The first bonding member 501 fills in the recessed region 16. A portion of the light guide plate 30 contacting the first bonding member 501 forms a first bonding edge portion 32. Thus, the first bonding member 501 binds the peripheral area 12, the edge of the optical film layer 20, and the first bonding edge portion 32 together.

The backplane 40 is arranged on a side of the light guide plate 30 away from the display panel 10 and includes a second bonding edge portion 42. The second bonding edge portion 42 is a peripheral edge portion of the backplane 40 and is coupled to the first bonding edge portion 32 of the light guide plate 30 by the second bonding member 502. Thus, the second bonding member 502 bonds the second bonding edge portion 42 to the first bonding edge portion 32.

In one embodiment, the bonding member 50 is an elastic colloid. In addition to binding the display panel 10, the optical film layer 20, the light guide plate 30, and the backplane 40 together, the bonding member 50 also has a buffering effect on the display panel 10, the optical film layer 20, the light guide plate 30, and the backplane 40 to prevent damage to internal components when subjected to an external force.

In one embodiment, the first bonding member 501 further has a light shielding effect to limit light transmittance and prevent light leakage. In other embodiments, the first bonding member 501 has a certain amount of light transmittance to prevent the first bonding member 501 from absorbing light and causing light loss.

In another embodiment, the first bonding member 501 is viewable from outside of the display module 100 and has a decorative effect.

A material of the second bonding member 502 may be the same as or different from a material of the first bonding member 501.

Figure 2:
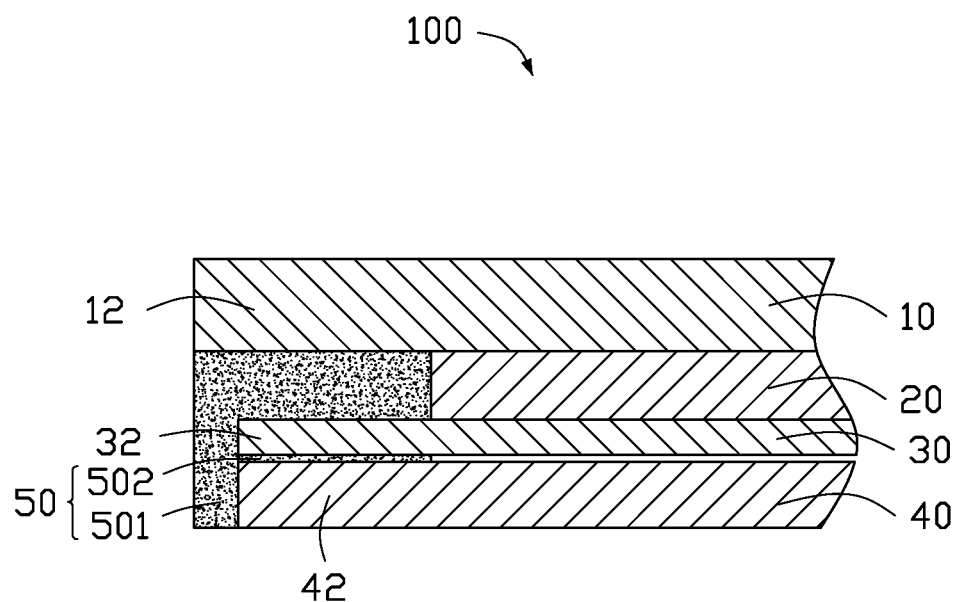
FIG. 2 is a cross-sectional view of a second embodiment of a display module.
Figure 3:
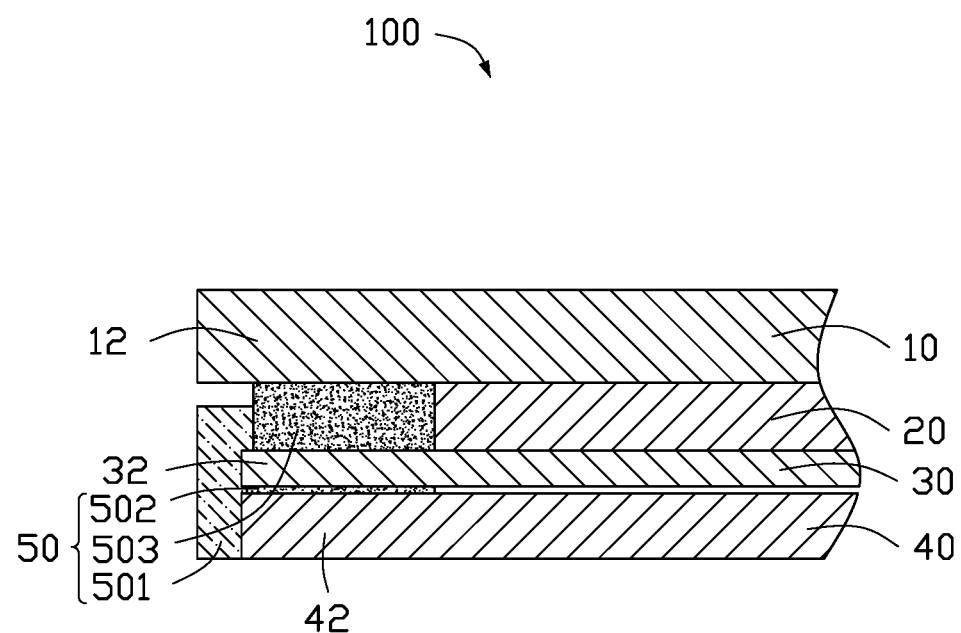
FIG. 3 is a cross-sectional view of a third embodiment of a display module.
Figure 4:
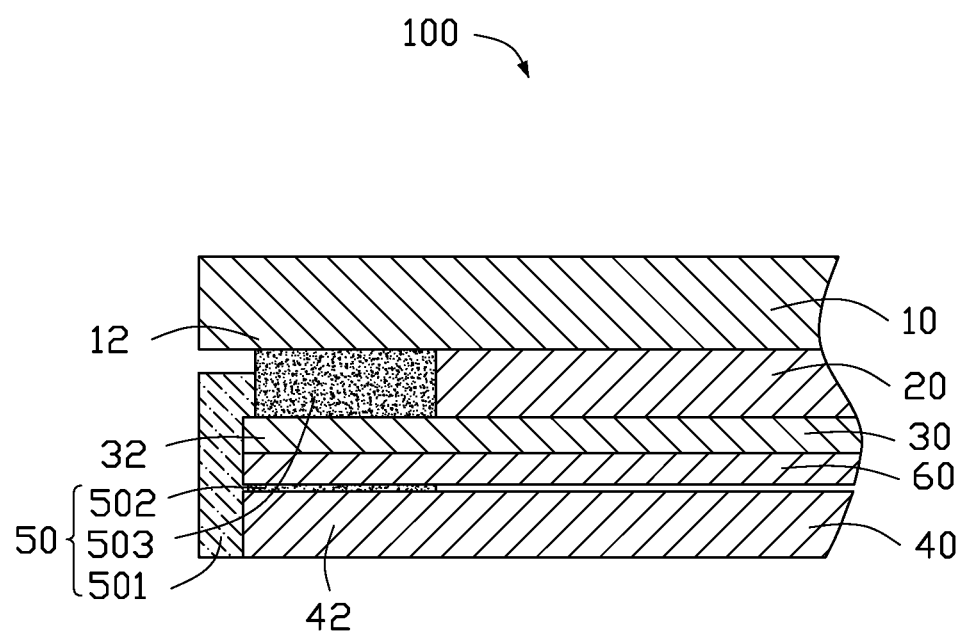
FIG. 4 is a cross-sectional view of a fourth embodiment of a display module.

FIG. 2, FIG. 3, and FIG. 4 respectively show a second embodiment, a third embodiment, and a fourth embodiment of the display module 100. The main difference in the second embodiment, the third embodiment, and the fourth embodiment is in the bonding member 50. The display panel 10, the optical film layer 20, the light guide plate 30, and the backplane 40 may be substantially the same as in the first embodiment.

Referring to FIG. 2, in the second embodiment, the display panel 10, the optical film layer 20, the light guide plate 30, and the backplane 40 are sequentially arranged and bonded together by the bonding member 50. In the second embodiment, the bonding member 50 includes the first bonding member 501 and the second bonding member 502. The first bonding member 501 and the second bonding member 502 may be composed of a same material or a different material.

In the second embodiment, an edge of the optical film layer 20, an edge of the light guide plate 30, and an edge of the backplane 40 stop short of the edge of the display panel 10 and cooperatively define the recessed region 16. The recessed region 16 is filled in by the first bonding member 501. The first bonding member 501 covers the edge of the light guide plate 30 and the edge of the backplane 40. An edge of the first bonding member 501 does not extend outward beyond the edge of the display panel 10. The first bonding edge portion 32 and the second bonding edge portion 42 are bonded together by the second bonding member 502. The bonding member 50 not only functions to bind the display panel 10, the optical film layer 20, the light guide plate 30, and the backplane 40, but also functions as a decorative element of the display module 100.

Referring to FIG. 3, in the third embodiment, the display panel 10, the optical film layer 20, the light guide plate 30, and the backplane 40 are sequentially arranged and bonded together by the bonding member 50. The bonding member 50 includes the first bonding member 501, the second bonding member 502, and a third bonding member 503. The first bonding member 501, the second bonding member 502, and the third bonding member 503 may be composed of the same material or different materials.

The edge of the display panel 10 extends outward beyond the edge of the optical film layer 20. The edge of the light guide plate 30 extends outward beyond the edge of the optical film layer 20, but stops short of the edge of the display panel 10. The display panel 10, the optical film layer 20, and the light guide plate 30 collectively define the recessed region 16. The third bonding member 503 fills in the recessed region 16 and bonds to a portion of the peripheral area 12 of the display panel 10. The third bonding member 503 does not extend all the way to the edge of the light guide plate 30. The second bonding member 502 bonds the first bonding edge portion 32 of the light guide plate 30 to the second bonding edge portion 42 of the backplane 40. The second bonding member 502 partially fills in a gap between the first bonding edge portion 32 and the second bonding edge portion 42. The first bonding member 501 fills in the rest of the gap between the first bonding edge portion 32 and the second bonding edge portion 42, covers the edge of the light guide plate 30 and the edge of the backplane 40, and extends to the edge of the display panel 10. The first bonding member 501 does not contact the display panel 10. The third bonding member 503 directly contacts the peripheral area 12 and supports the peripheral area 12. Thus, the third bonding member 503 may be composed of an elastic material to provide a buffering effect for the display panel 10, the optical film layer 20, and the light guide plate 30.

The first bonding member 501 may be composed of a thermoplastic material, which when heated, is shaped to form a planar outer surface. In other embodiments, the outer surface of the first bonding member 501 may be further processed to achieve specific decorative effects.

Referring to FIG. 4, a fourth embodiment of the display module 100 is substantially similar to the third embodiment. The fourth embodiment differs from the third embodiment in that in the fourth embodiment, the display module 100 further includes an optical element layer 60, such as a reflective sheet, arranged between the light guide plate 30 and the backplane 40. The optical element layer 60 may include one or more reflective sheets stacked in layers. In the fourth embodiment, the optical element layer 60 is directly arranged on a side of the light guide plate 30 away from the display panel 10, and the second bonding member 502 is between the optical element layer 60 and the backplane 40, such that the second bonding member 502 partially fills in a gap between the optical element layer 60 and the backplane 40. The first bonding member 501 fills in the rest of the gap between the optical element layer 60 and the backplane 40, covers the edge of the light guide plate 30 and the edge of the backplane 40, and extends to the edge of the display panel 10.

It is to be understood that in other embodiments, the optical element layer 60 may take on other forms, and the bonding member 50 may take on the forms of the previous embodiments or may take on other forms.

Figure 5:
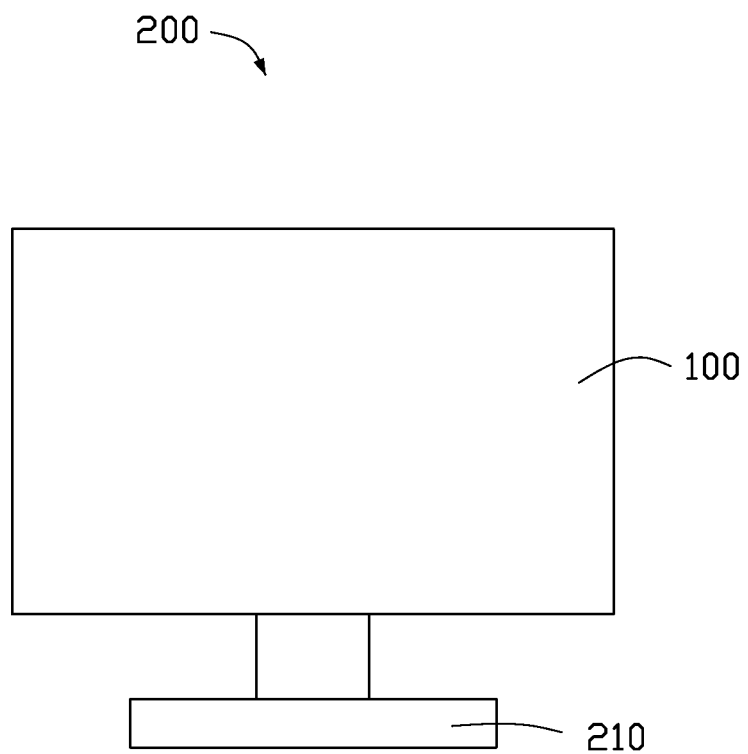
FIG. 5 is a diagram of an embodiment of an electronic device including a display module of the embodiment as shown in FIGS. 1-4.

Referring to FIG. 5, an electronic device 200 includes a main body 210 and a display module 100 mounted on the main body 210. The display module 100 has a full screen display, and elements of the display module 100 are fixed in place by the bonding member 50.

The display module 100 as described in the previous embodiments uses the bonding member 50 instead of a well-known middle frame structure or a well-known plastic frame to bond the display panel 10, the optical film layer 20, the light guide plate 30, and the backplane 40 together. Thus, a whole surface of the display panel 10 is able to be utilized for display. The bonding member 50 not only achieves a bonding function and a buffering effect, but also achieves an outer decorative effect.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:
1. A display module comprising:
a display panel;
an optical film layer arranged on a side of the display panel;
a light guide plate arranged on a side of the optical film layer away from the display panel;
a backplane arranged on a side of the light guide plate away from the display panel; and
a bonding member; wherein:
the bonding member comprises a first bonding member and a second bonding member; the display panel, the optical film layer, and the light guide plate cooperatively define a recessed region;

the first bonding member fills in the recessed region and the display panel, the second bonding member is between the light guide plate and the backplane, and the first bonding member touches the optical film layer; the optical film layer, the light guide plate, and the backplane are bonded to each other by the bonding member.

2. The display module of claim 1 wherein:
the display panel comprises a display area and a peripheral area;
the peripheral area surrounds the display area;
the optical film layer is positioned facing the display area;
an edge of the display panel extends outward beyond an edge of the optical film layer;
an edge of the light guide plate extends outward beyond the edge of the optical film layer, the edge of the light guide plate stops short of the edge of the display panel;
the peripheral area, the edge of the optical film layer, and the edge of the light guide plate cooperatively define the recessed region.

3. The display module of claim 2, wherein:
the light guide plate comprises a first bonding edge portion;
the backplane comprises a second bonding edge portion;
the second bonding member fills in between the first bonding edge portion and the second bonding edge portion.

4. The display module of claim 3, wherein the second bonding member extends to an edge of the first bonding edge portion and the second bonding edge portion.

5. The display module of claim 4, wherein:
an edge of the first bonding member, an edge of the second bonding member, and an edge of the light guide plate are coplanar; and
the edge of the display panel extends outward beyond the edge of the first bonding member, the edge of the optical film layer, the edge of the second bonding member, and the edge of the light guide plate.

6. The display module of claim 4, wherein:
an edge of the light guide plate, an edge of the second bonding member, and an edge of the backplane are coplanar;
the first bonding member covers the edge of the light guide plate, the edge of the second bonding member, and the edge of the backplane and fills in the recessed region;
an edge of the first bonding member is coplanar with the edge of the display panel.

7. The display module of claim 1, wherein:
the display panel comprises a display area and a peripheral area;
the peripheral area surrounds the display area;
the optical film layer is positioned facing the display area;
an edge of the display panel extends outward beyond an edge of the optical film layer;
an edge of the light guide plate extends outward beyond an edge of the optical film layer, the edge of the light guide plate stops short of the edge of the display panel;
the peripheral area, the edge of the optical film layer, and the edge of the light guide plate cooperatively define the recessed region.

8. The display module of claim 7, wherein:
the bonding member comprises a first bonding member, a second bonding member, and a third bonding member;
the third bonding member fills in the recessed region;
the second bonding member fills between the light guide plate and the backplane; and
the first bonding member fills in the recessed region and between the light guide plate and the backplane.

9. The display module of claim 8, wherein:
the light guide plate comprises a first bonding edge portion;
the backplane comprises a second bonding edge portion;
the second bonding member fills in between a portion of the first bonding edge portion and a portion of the second bonding edge portion.

10. The display module of claim 9, wherein:
an edge of the second bonding member does not extend to an edge of the first bonding edge portion and the second bonding edge portion.

11. The display module of claim 10, wherein:
an edge of the light guide plate and an edge of the backplane are coplanar;
the edge of the display panel extends outward beyond the edge of the light guide plate and beyond the edge of the backplane.

12. The display module of claim 11, wherein:
the first bonding member covers the edge of the light guide plate and the edge of the backplane;
the first bonding member fills a remaining portion between the light guide plate and the backplane;
an edge of the first bonding member is coplanar with the edge of the display panel; and
the first bonding member does not contact the display panel.

13. The display module of claim 7 further comprising an optical element layer, wherein:
the display panel, the optical film layer, and the light guide plate cooperatively define the recessed region;
the optical element layer is arranged on a side of the light guide plate away from the display panel;
the optical element layer directly contacts the light guide plate;
the bonding member comprises a first bonding member, a second bonding member, and a third bonding member;
the third bonding member fills in the recessed region;
the second bonding member fills in between the optical element layer and the backplane; and
the first bonding member fills in the recessed region and between the optical element layer and the backplane.

14. The display module of claim 13, wherein:
an edge of the second bonding member does not extend to an edge of the optical element layer and the backplane.

15. The display module of claim 14, wherein:
an edge of the light guide plate, an edge of the optical element layer, and an edge of the backplane are coplanar;
the edge of the display panel extends outward beyond the edge of the light guide plate, the edge of the optical element layer, and the edge of the backplane.

16. The display module of claim 15, wherein:
the first bonding member covers the edge of the light guide plate, the edge of the optical element layer, and the edge of the backplane;
the first bonding member fills in a remaining portion between the optical element layer and the backplane;
an edge of the first bonding member is coplanar with the edge of the display panel; and
the first bonding member does not contact the display panel.

17. An electronic device comprising a main body and a display module mounted on the main body, the display module comprising:
a display panel;

an optical film layer arranged on a side of the display panel;
a light guide plate arranged on a side of the optical film layer away from the display panel;
a backplane arranged on a side of the light guide plate away from the display panel; and
a bonding member; wherein:
the bonding member comprises a first bonding member and a second bonding member; the display panel, the optical film layer, and the light guide plate cooperatively define a recessed region;
the first bonding member fills in the recessed region and the display panel, the second bonding member is between the light guide plate and the backplane, and the first bonding member touches the optical film layer; the optical film layer, the light guide plate, and the backplane are bonded to each other by the bonding member.

18. The electronic device of claim 17, wherein:
the display panel comprises a display area and a peripheral area;
the peripheral area surrounds the display area;
the optical film layer is positioned facing the display area;
an edge of the display panel extends outward beyond an edge of the optical film layer;
an edge of the light guide plate extends outward beyond the edge of the optical film layer, the edge of the light guide plate stops short of the edge of the display panel; and
the peripheral area, the edge of the optical film layer, and the edge of the light guide plate cooperatively define the recessed region.

* * * * *